US 7,623,512 B2

United States Patent
Kim et al.

(10) Patent No.: US 7,623,512 B2
(45) Date of Patent: Nov. 24, 2009

(54) SYSTEM, MEDIUM, AND METHOD FOR ESTIMATING DISTANCE IN COMMUNICATION SYSTEM HAVING NODES

(75) Inventors: Dae-young Kim, Daejeon (KR); Duy-bach Bui, Honoi (VN); Ji-tae Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 671 days.

(21) Appl. No.: 11/144,690

(22) Filed: Jun. 6, 2005

(65) Prior Publication Data

US 2005/0271057 A1 Dec. 8, 2005

(30) Foreign Application Priority Data

Jun. 4, 2004 (KR) .................... 10-2004-0040997

(51) Int. Cl.
*H04L 12/50* (2006.01)
(52) U.S. Cl. .................... 370/370; 455/456.1
(58) Field of Classification Search ............ 370/370, 370/349, 252, 253, 389; 455/414.2, 456.1–456.6, 455/457, 41.2, 41.3; 709/238, 239, 241
See application file for complete search history.

(56) References Cited

U.S. PATENT DOCUMENTS

| | | | | |
|---|---|---|---|---|
| 5,293,645 A | * | 3/1994 | Sood | ............ 455/456.2 |
| 6,996,403 B2 | * | 2/2006 | Shi et al. | ............ 455/456.1 |
| 7,286,844 B1 | * | 10/2007 | Redi et al. | ............ 455/522 |
| 2003/0144006 A1 | * | 7/2003 | Johansson et al. | ............ 455/456 |
| 2004/0246904 A1 | * | 12/2004 | Zhang et al. | ............ 370/252 |
| 2005/0233748 A1 | * | 10/2005 | Robinson et al. | ............ 455/440 |

OTHER PUBLICATIONS

Savarese, et al, "Robust Positioning Algorithms for Distributed Ad-Hoc Wireless Sensor Networks" Useninx Technical Annual Conference, pp. 317-328, Monterey, California Jun. 2001.*
Nath, et al, "Ad Hoc Positioning Systems (APS)" Global Telecommunications Conference, 2001 Globecom'01.*

* cited by examiner

*Primary Examiner*—Ricky Ngo
*Assistant Examiner*—Gary Mui
(74) *Attorney, Agent, or Firm*—Staas & Halsey LLP

(57) ABSTRACT

A method, medium, and system estimating a location of a node, whose location is unknown, in a communication system including both nodes having known locations and nodes having unknown locations. A first packet is transmitted and received between nodes having known locations, via a node having an unknown location to be estimated. A second packet, which contains a distance function coefficient acquired using first information and second information included in the received first packet, is transferred to the node having the unknown location to be estimated. The unknown location is then estimated using the received distance function coefficient.

18 Claims, 4 Drawing Sheets

SYSTEM, MEDIUM, AND METHOD FOR ESTIMATING DISTANCE IN COMMUNICATION SYSTEM HAVING NODES

CROSS-REFERENCE TO RELATED APPLICATIONS

This application claims the benefit under 35 U.S.C. § 119(a) from Korean Patent Application No. 2004-40997 filed on Jun. 4, 2004 in the Korean Intellectual Property Office, the entire disclosure of which is incorporated herein by reference.

BACKGROUND OF THE INVENTION

1. Field of the Invention

Embodiments of the present invention relate to a system, medium, and method for estimating unknown locations of nodes by use of location information on nodes having known locations in a communication system including the nodes.

2. Description of the Related Art

Figure 1:
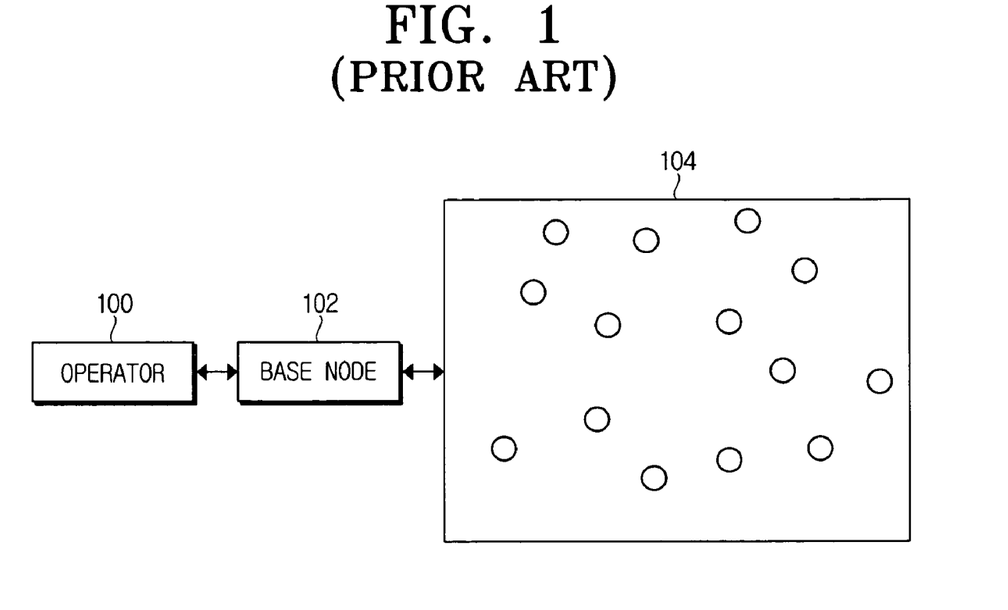
FIG. 1 illustrates a conventional configuration of an ad-hoc sensor network.

In a general communication system, data is transmitted and received between a mobile element and a base station. That is, the mobile element and the base station directly transmit and receive data without having to pass through other nodes. In contrast, when data of a certain node is to be transmitted to a base node in an ad-hoc sensor network, other nodes can also be utilized. Referring to FIG. 1, the configuration of the ad-hoc sensor network is described below. The ad-hoc sensor network includes of an operator 100, a base node 102, and a plurality of nodes, as shown in FIG. 1.

The operator 100 requests the base node 102 to collect necessary data. The data requested by the operator 100 may relate to information on temperature of the environment around a sensor field 104, for example. The base node 102 requests the requested data from each node located in the sensor field 104, and forwards the data received from each node to the operator 100. Likewise, each node collects the data requested by the base node 102, and transmits the collected data to the base node 102. Nodes located within a certain distance from the base node 102 transmit the collected data directly to the base node 102. Other nodes located outside of the certain distance from the base node 102 transmit the collected data to the base node 102, via adjacent nodes of the base node 102, not directly to the base node 102, so as to minimize the power consumed for the data transmission. Typically, the distance between the base node 102 to another node is directly proportional to the power consumed by the data transmission between the base node 102 and the other node. Accordingly, nodes outside of the certain distance from the base node 102 transmit their collected data via a plurality of other nodes so as to reduce the power consumption for the data transmission. Hereinbelow, a node relaying data of another node will be referred to as a relay node. The relay node can transmit the collected data directly to the base node 102 or via other relay nodes.

The nodes in the sensor network require and obtain location information of each node to transmit data to the base node 102. By use of the location information, it can be determined whether to transmit the data directly to the base node 102 or via the other nodes, i.e., relay nodes.

The nodes in the sensor network may obtain their locations by way of a global positioning system (GPS), and can then exchange the obtained location information with each other. However, all the nodes in the sensor network may not have GPS, which is high-priced. Thus, some of the nodes in the sensor network have GPS, while the other nodes utilize the location information of the GPS equipped nodes. Specifically, the nodes without GPS may estimate their locations by use of the relative locations from the GPS-equipped nodes. A method for estimating the locations of the non-GPS equipped nodes is described below.

Figure 2:
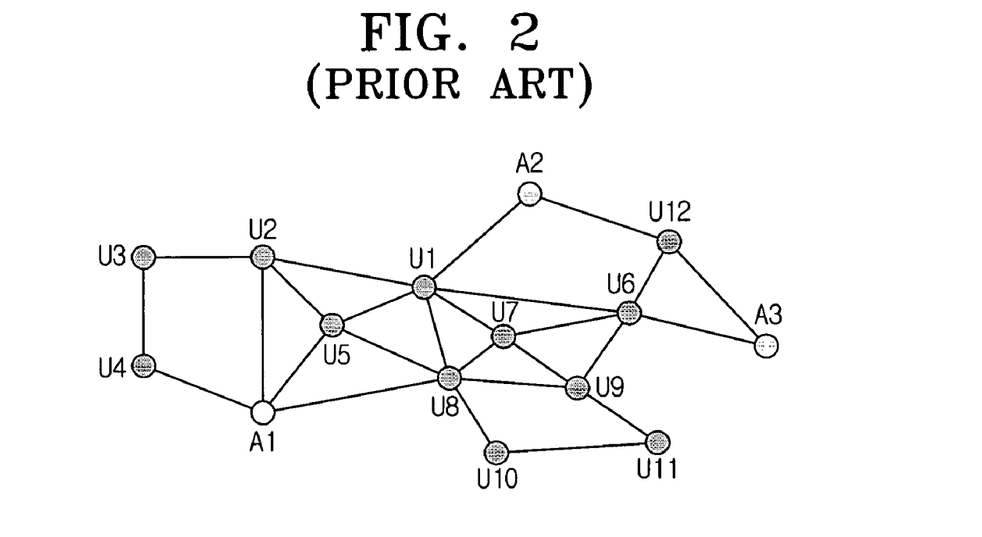
FIG. 2 illustrates nodes in the conventional ad-hoc sensor network.

FIG. 2 illustrates nodes in the sensor network. The nodes A1 through A3 are equipped with GPS, and the nodes U1 through U4 are not equipped with GPS. Thus, the nodes A1 through A3 can acquire their locations using the GPS while the nodes U1 through U4 cannot acquire their locations, due to their absence of GPS. The non-GPS equipped nodes can estimate their locations using Sum-dist and DV-hop.

A distance between adjacent nodes can be calculated using power consumption for the data transmission and reception. As noted above, power consumption depends on transmission distance. Typically, the distance between the nodes is directly proportional to the power consumption. The power consumption enables one to calculate the distance between the nodes. For example, it can be assumed that the distance between the nodes A2 and U1 is 6, the distance between the nodes U1 and U5 is 4, and the distance between the nodes U6 and A3 is 5. The distance between the nodes U1 and U6 is 6, and the distance between the nodes U6 and A3 is 5.

The following describes how the distance between remote nodes can be calculated using Sum-dist, particularly, the distance of the node U1 with respect the nodes A1 through A3. The distance between the nodes A1 and U1 is 9 by simply adding the distance 4 between the nodes U1 and U5 and the distance 5 between the nodes U5 and A1. The distance between the nodes A2 and U1 is 6. The distance between the nodes A3 and U1 is estimated to 11 by simply adding the distance 6 between the nodes U1 and U6 and the distance 5 between the nodes U6 and A3.

DV-hop calculates distances between nodes using a hop number between the nodes and an average hop distance. The nodes A1 and A2 know their locations using their GPS, as mentioned above, and can acquire the distance between the nodes A1 and A2 using their location information. For example, it is assumed that the distance between the nodes A1 and A2 is 12. As the hop number between the nodes A1 and A2 is 3, the per-hop distance can be calculated as 4. The hop indicates the transmission unit. Accordingly, the nodes A1 and A2 have three transmission units of the nodes A1 and U5, the nodes U5 and U1, and the nodes U1 and A2. The nodes A1 and U1 have two hops, with a distance of 8 therebetween. The nodes A2 and U1 have one hop, with a distance 4 therebetween. Further, the nodes U1 and A3 have two hops, with a of distance 8.

The conventional methods can calculate the relative distance in such simple manners, but provide inaccurate distances. That is, the conventional methods adds the distances between nodes without considering the topology of the nodes. DV-hop, especially, does not consider that the per-hop distance may differ between different nodes.

SUMMARY OF THE INVENTION

Embodiments of the present invention have been developed to solve the aforementioned problems and others associated with the conventional arrangement. An aspect of embodiments of the present invention provides a system, medium, and method for minimizing error probability when estimating a distance between nodes.

Another aspect of embodiments of the present invention provides a system, medium, and method for estimating a distance between nodes in different manners and minimizing error in the estimated distances between the nodes.

A further aspect of the present invention provides a system, medium, and method for estimating a relative distance from a node to other nodes in a selected manner.

To achieve the above and/or other aspects and advantages, embodiments of the present invention set forth a method for estimating an unknown location of a first node in a communication system including nodes having known locations and nodes having unknown locations, including transmitting and receiving first packets between nodes having known locations via the first node, sending a second packet to the first node, the second packet containing a distance function coefficient acquired using first information and second information included in at least one of the first packets, and estimating the unknown location of the first node using the distance function coefficient.

The first information may be a sum of transmission distances of a first packet and the second information is a hop counter. In addition, the initial transmission of a first packet may be performed by a node knowing its location, with the initial setting of the first information being zero and the initial setting of the second information being zero.

An initiating sending of the second packet may be performed only by a node knowing its location.

Further, the first node may calculate and store distances to one-hop nodes.

In addition, one first packet may contain location information of a node that transmitted the one first packet. A node relaying the one first packet may also update the first information and the second information of the one first packet, and transfer the updated first packet with the updated first and second information. Further, if at least three first packets are received, distance function coefficients are calculated in accordance with the following equation:

$$\begin{bmatrix} d_1 \\ d_2 \\ \ldots \\ d_n \end{bmatrix} = \begin{pmatrix} sd_1 & h_1 & 1 \\ sd_2 & h_2 & 1 \\ \ldots & \ldots & \ldots \\ sd_n & h_n & 1 \end{pmatrix} \begin{bmatrix} \alpha_0 \\ \alpha_1 \\ \alpha_2 \end{bmatrix},$$

wherein n is a natural number equal to or greater than 3, d is an actual distance between a node transmitting the one of the three first packets and a node receiving the one of the three first packets and calculated using location information, sd is a corresponding first information, h is corresponding second information, and $\alpha_0, \alpha_1, \alpha_2$ are distance function coefficients.

The estimating of the unknown location may further include receiving at least three second packets, calculating distances to nodes transmitting the second packets by use of distance function coefficients contained in the received second packets and first and second information with respect to the nodes transmitting the second packets, and estimating the unknown location using the unknown locations of and the distances to the nodes transmitting the second packet.

To achieve the above and/or other aspects and advantages, embodiments of the present invention set forth a system estimating an unknown location of a second node using a known location of a first node, both in a communication system, including the first node generating a second packet containing a distance function coefficient calculated using first information and second information contained in a first packet received via the second node, and the second node estimating its location using the distance function coefficient, as received by the second node in the second packet.

The first node may transfer the first packet, containing location information of the first node, to another node having a known location. In addition, the first information may be a packet transfer distance and the second information is a hop counter with respect to the packet transfer. A node relaying the first packet may also update the first information and the second information of the first packet, and transfer the updated first packet with the updated first and second information.

The first node may calculate distance function coefficients if at least three first packets are received in accordance with the following equation:

$$\begin{bmatrix} d_1 \\ d_2 \\ \ldots \\ d_n \end{bmatrix} = \begin{pmatrix} sd_1 & h_1 & 1 \\ sd_2 & h_2 & 1 \\ \ldots & \ldots & \ldots \\ sd_n & h_n & 1 \end{pmatrix} \begin{bmatrix} \alpha_0 \\ \alpha_1 \\ \alpha_2 \end{bmatrix},$$

wherein n is a natural number equal to or greater than 3, d is an actual distance between a node transmitting one of the three first packets and a node receiving the one of the three first packets and calculated using location information, sd is a corresponding first information, h is a corresponding second information, and $\alpha_0, \alpha_1, \alpha_2$ are distance function coefficients.

The second node, when at least three second packets are received by the second node, may also calculate distances to nodes transmitting the second packets by use of distance function coefficients contained in the received second packets and stored first and second information with respect to the nodes transmitting the second packets, and the second node may estimate the unknown location using locations of and the distances to the nodes transmitting the second packets.

To achieve the above and/or other aspects and advantages, embodiments of the present invention set forth media including computer readable code implementing embodiments of the present invention.

To achieve the above and/or other aspects and advantages, embodiments of the present invention set forth a sensor network, including a base node, and a plurality of nodes communicating sensory data to the base nodes based on locations of each of the plurality of nodes, using embodiments of the present invention setting forth an estimating an unknown location of for nodes whose location is unknown.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of exemplary embodiments, taken in conjunction with the accompanying drawing figures of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the drawings.

Figure 3:
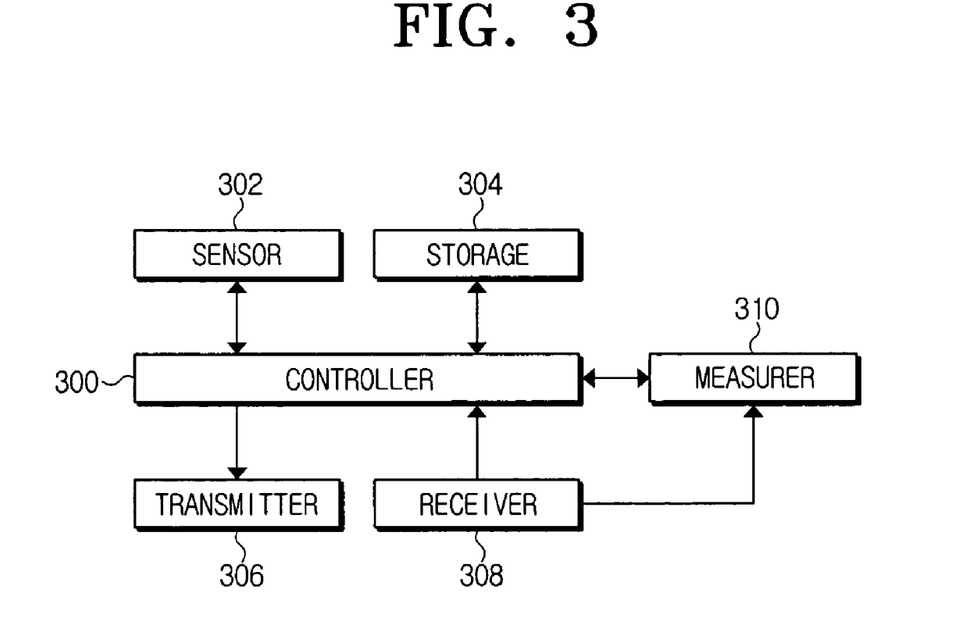
FIG. 3 illustrates a structure of a node, according to an embodiment of the present invention.

FIG. 3 is a block diagram of a node, according to an embodiment of the present invention. The node includes a controller 300, a sensor 302, a transmitter 306, a receiver 308, a measurer 310, and a storage 304. It is noted that FIG. 3 illustrates parts for embodiments of the present invention and that the node can include additional and/or other parts.

The sensor 302 collects information relating to a sensor field according to a control instruction of the controller 300. For example, if the controller 300 sends the instruction to measure a temperature of the sensor field, the sensor 302 measures and provides the temperature of the sensor field to the controller 300. The sensor 302 may provide the collected information to the controller 300 only upon receiving the control instruction, or, send the collected information to the controller 300 at a predetermined time interval, for example.

The transmitter 306 forwards the temperature information, for example, which is collected according to the control instruction of the controller 300, to an adjacent node or a base node. The transmitter 306 sends a signal to measure a distance to an adjacent node, according to a control instruction of the controller 300, for example. The signal contains information relating to a transmitted power.

The receiver 308 can receive a similar signal including information relating to the sensor field. The receiver 308 may receive a signal including information for the distance measurement. The receiver 308, accordingly, provides the received signal to the controller 300 and the measurer 310.

The measurer 310 measures a received power with respect to the signal provided from the receiver 308, according to a control instruction of the controller 300, for example. The measurer 310 may then provide the measured received power to the controller 300.

The controller 300 can calculate a ratio of the transmitted power included in the signal provided from the receiver 308 with respect to the receiver power provided from the measurer 310. The storage 304 can thus keep a table indicating the relationship between the ratio of the transmitted power with respect to the receiver power, and the distance. Table 1 shows an example of the table stored in the storage 304.

TABLE 1

| Receiver power/transmitted power | Distance |
|---|---|
| 0.9 | 1 |
| 0.8 | 2 |
| 0.1 | 10 |

The controller 300 acquires the distance to the node which sent the signal by use of the information in the storage 304 and the calculated ratio of the transmitted power to the received power.

FIG. 3 illustrates parts of the node which do cannot recognize its location. A node which obtains its location from a GPS can include a device for receiving a signal from the GPS, in addition to these above-mentioned parts.

Figure 4:
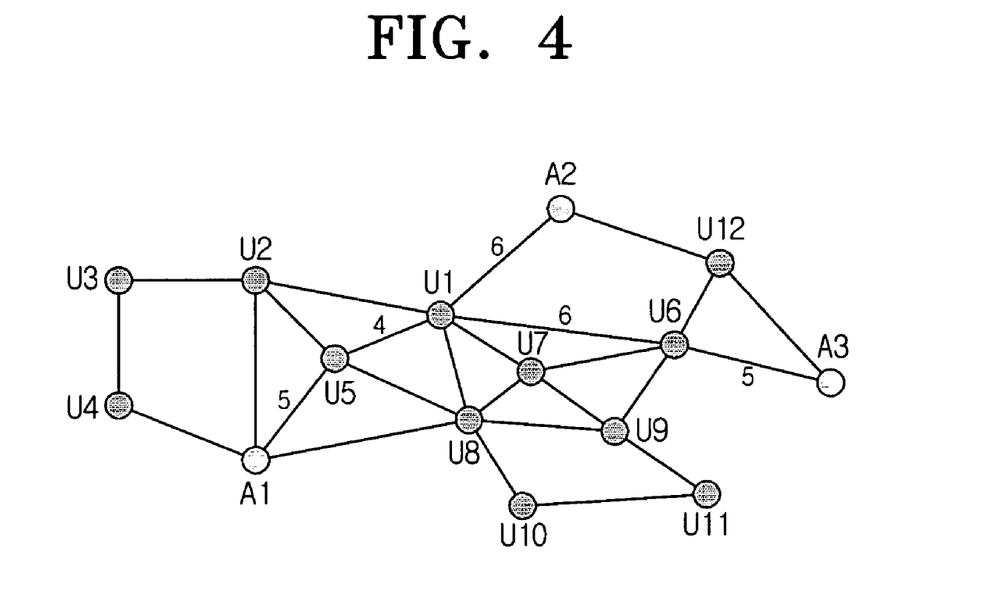
FIG. 4 illustrates distances between nodes in an ad-hoc sensor network, according to an embodiment of the present invention.

FIG. 4 illustrates measured distances between nodes in an ad-hot network of FIG. 2. As described above, distances between adjacent nodes are shown in FIG. 4. The following explains a distance measurement between nodes using the distance information of FIG. 4.

Figure 5:
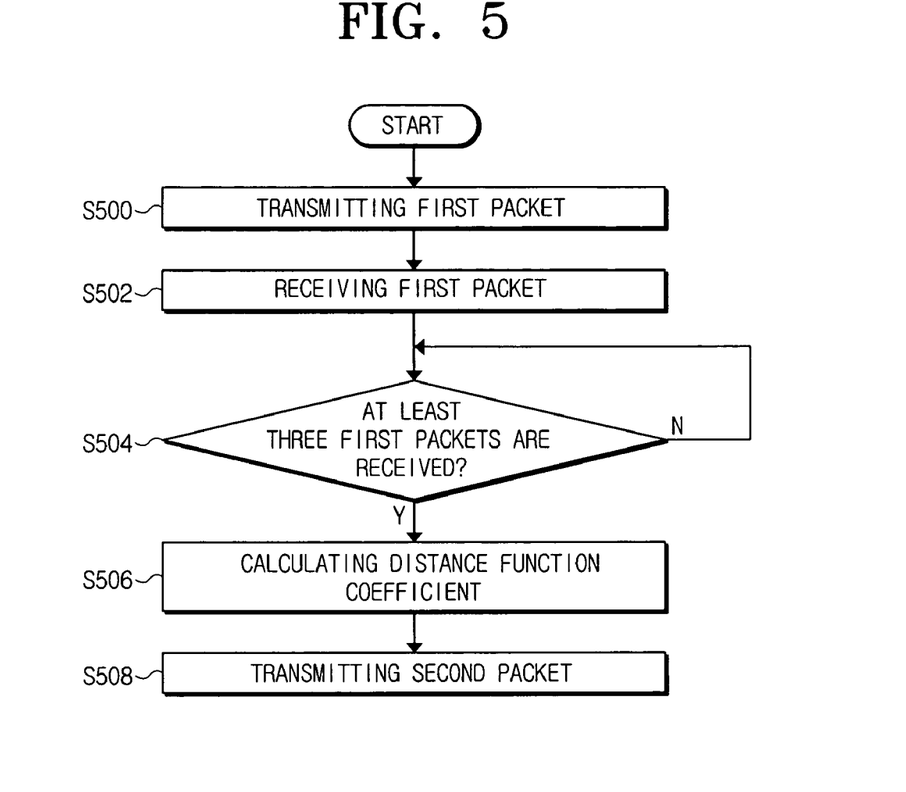
FIG. 5 illustrates an operation of a node having a known location, according to an embodiment of the present invention.
Figure 8:
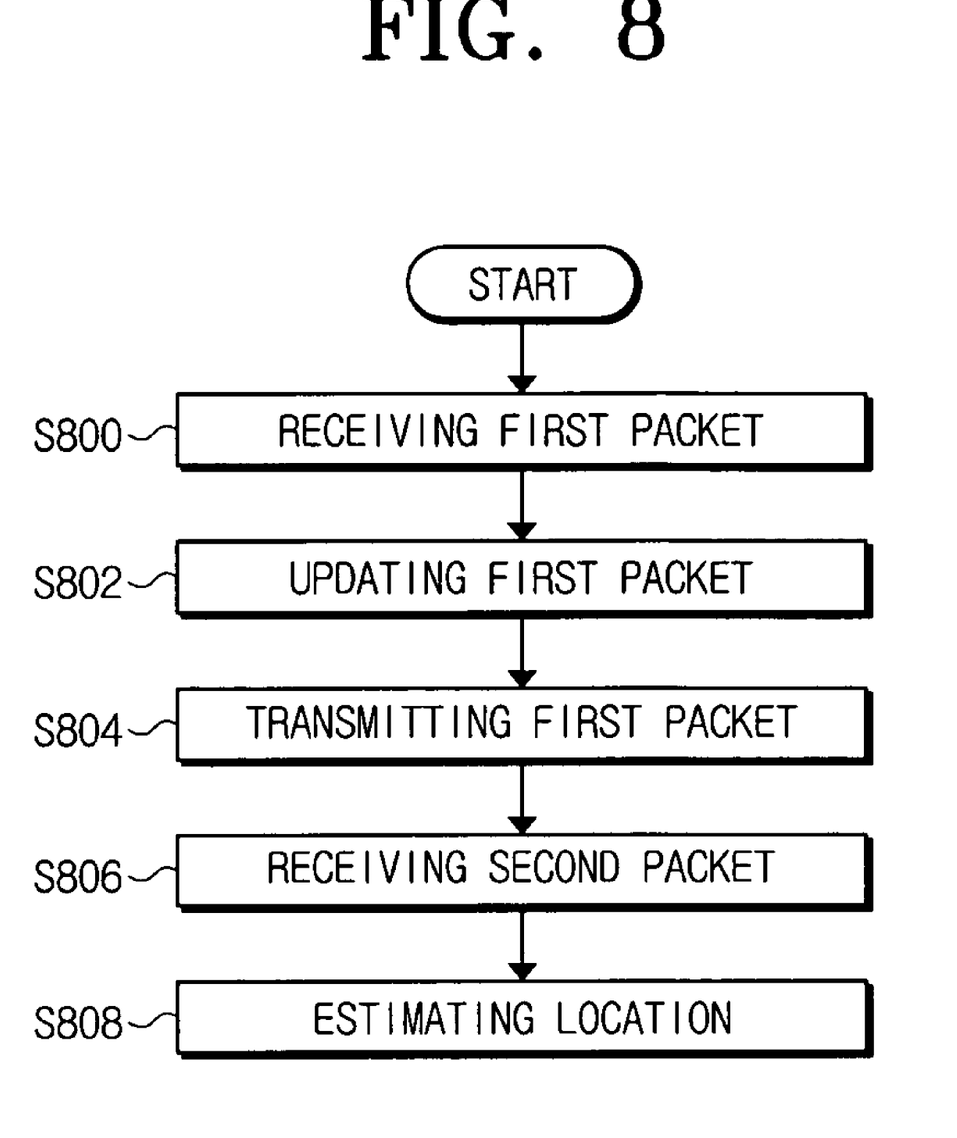
FIG. 8 illustrates an operation of a node having an unknown location, according to an embodiment of the present invention.

FIGS. 5 and 8 illustrate an operation for a node that measures distances with adjacent nodes.

FIG. 5 first illustrates an operation of nodes having a known location, according to an embodiment of the present invention. Referring back to FIG. 4, nodes A1 through A3 know their locations. Although three nodes are aware of their locations in FIG. 4, the following explains that actually four, or more, nodes can be aware of their locations.

Figure 6:
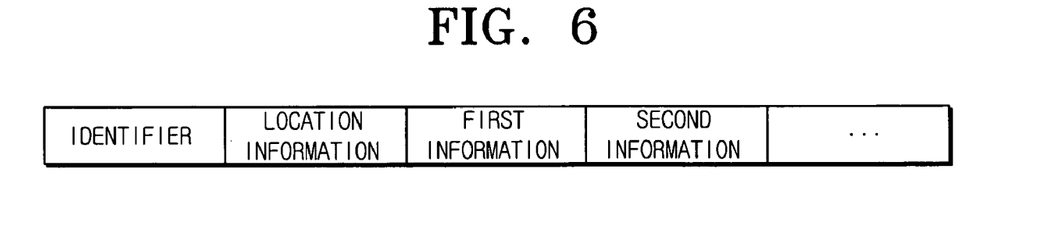
FIG. 6 illustrates a structure of a first packet, according to an embodiment of the present invention.

A first node, of the nodes that know their location, sends an initial first packet (S500). A frame structure of such a first packet is depicted in FIG. 6. The frame of the first packet includes an identifier, a location information, first information, and second information. The identifier identifies the first node transmitting the first packet. The location information contains information relating to the location of the first node. As mentioned above, the first node knows its location. Typically, the location information is represented in two dimensions. A node, which knows its location by sending and receiving the location information, can also obtain location information of other nodes.

The first information is a sum of the transmission distances of the first packet, and is initially set to 0. The second information is a hop counter, also initially set to 0.

The first node may then receive a first packet from another node (S502). The other node typically is a node that does not know it's own location, i.e., first packets from nodes knowing their addresses may be transmitted and received via a node that doesn't know its own location. The first node then determines whether more than three first packets have been received (S504). If so, the first node proceeds to operation S506, or if not, the first node repeats operation S504.

The first node, again, which already knows its location, then calculates distance function coefficients using the received packets. The distance function coefficients are acquired using the first and second information in the frames of the received first packets, in accordance with the following equation:

Equation 1

$$d = \alpha_0 \times sd + \alpha_1 \times h + \alpha_2.$$

Here, sd corresponds to the first information, h corresponds to the second information, and $\alpha_0, \alpha_1, \alpha_2$ correspond to distance function coefficients. Equation 1 can also be expressed as the following equation:

Equation 2

$$\begin{bmatrix} d_1 \\ d_2 \\ \vdots \\ d_n \end{bmatrix} = \begin{pmatrix} sd_1 & h_1 & 1 \\ sd_2 & h_2 & 1 \\ \vdots & \vdots & \vdots \\ sd_n & h_n & 1 \end{pmatrix} \begin{bmatrix} \alpha_0 \\ \alpha_1 \\ \alpha_2 \end{bmatrix}.$$

Here, $d_1$, $d_2$, $d_n$ can be obtained using the location information in the frames of the first packets and their location information. That is, the distances to nodes are calculated using at least two known location information. The distance function coefficients can be calculated using the three first packets.

Table 2 shows the information contained in exemplary received first packets and distances to the nodes transmitting the first packets that are obtained from the same.

TABLE 2

| Node transmitting first packet | Distance to node transmitting first packet | First information | Second information |
|---|---|---|---|
| A1 | 9 | 15 | 4 |
| A2 | 6 | 10 | 2 |
| A3 | 7 | 12 | 2 |

For example, the distance function coefficients $\alpha_0=0.5$, $\alpha_1=0.25$, $\alpha_2=0.5$ can be acquired using the information in Table 2.

Figure 7:
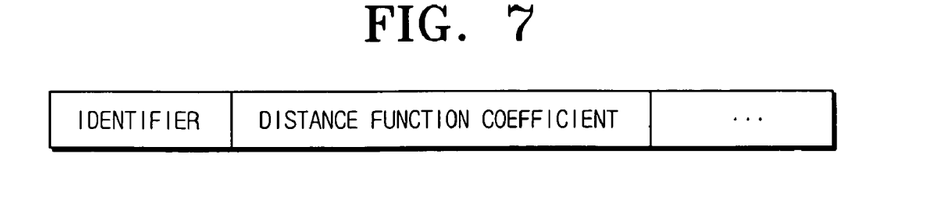
FIG. 7 illustrates a structure of a second packet, according to an embodiment of the present invention.

The first node then sends a second packet (S508). The frame structure of the second packet is shown in FIG. 7. The frame of the second packet can include an identifier and a distance function coefficient, with the identifier being an identifier of the first node transmitting the second packet, for example.

FIG. 8 illustrates an operation for nodes that do not know their location.

Such a second node may receive a first packet (S800). The second node then updates the received first packet (S802). Information relating to the update includes first information and second information. Again, the first information is the distance between nodes sending and receiving the first packet, and is updated by adding to the distance between the node transmitting the first packet and the second node. For example, if the first information of the received first packet is 3 and the distance between the node transmitting the first packet and the receiving node is 4, the first information is updated to 7. As the second information is a hop counter, the second node increases the received second information by one. For example, if the second information of the received first packet is 1, the second information is updated to 2. The second node stores the updated first packet. The second node then transmits the updated first packet (S804).

The node can receive one of the aforementioned second packets (S806), transmitted by one of the first nodes knowing their locations, and estimates its location using the received second packet (S808). Specifically, the second node calculates a distance to the node transmitting the second packet by use of the distance function coefficient contained in the received second packet and the first and second information stored within the second node. The distance can be obtained in accordance with Equation 1. For example, if the received coefficients are $\alpha_0=0.5$, $\alpha_1=0.25$, $\alpha_2=0.5$, the stored first information is 9, and the stored second information is 2, the distance to the node transmitting the second packet is 5.5.

When at least three second packets are received, the second node calculates the distance to the node transmitting the second packets and estimates its own location. In more detail, the second node can estimate its location by calculating the distances to the at least three nodes having known locations, thereby meeting the aforementioned notation that more than three nodes can accurately know their locations.

In light of the foregoing as mentioned above, embodiments of the present invention can minimize possible errors by estimating distances between nodes by way of a hop counter.

In detail, the distances between the nodes are estimated using distance function coefficients calculated from transmitted and received packets.

Exemplary embodiments may be embodied in general-purpose computing devices by running computer readable code from a medium, e.g. computer-readable medium, including but not limited to storage/transmission media such as magnetic storage media (ROMs, RAMs, floppy disks, magnetic tapes, etc.), optically readable media (CD-ROMs, DVDs, etc.), and carrier waves (transmission over the internet). Exemplary embodiments may be embodied as a medium having a computer-readable program code embodied therein for causing a number of computer systems connected via a network to effect distributed processing. The network may be a wired network, a wireless network or any combination thereof. The functional programs, instructions, codes and code segments for embodying the present invention may be easily deducted by programmers in the art which the present invention belongs to.

While exemplary embodiments of the present invention have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

What is claimed is:

1. A method for estimating an unknown location of a first node in a communication system including nodes having known locations and nodes having unknown locations, comprising:

transmitting and receiving first packets between nodes having known locations via the first node whose location is unknown;

sending a second packet to the first node, the second packet containing a distance function coefficient acquired using a sum of transmission distances of the first packet and a hop counter included in at least one of the first packets; and estimating the unknown location of the first node using the distance function coefficient.

2. The method of claim 1, wherein the initial transmission of a first packet is performed by a node knowing its location.

3. The method of claim 2, wherein the initial setting of the first information is zero and the initial setting of the second information is zero.

4. The method of claim 1, wherein an initiating sending of the second packet is performed only by a node knowing its location.

5. The method of claim 1, wherein the first node calculates and stores distances to one-hop nodes.

6. The method of claim 1 wherein the one first packet contains location information of a node that transmitted the one first packet.

7. The method of claim 6, wherein the first information is a packet transfer distance and the second information is a hop counter with respect to the packet transfer.

8. The method of claim 7, wherein a node relaying the one first packet updates the first information and the second information of the one first packet, and transfers the updated first packet with the updated first and second information.

9. The method of claim 8, wherein, if at least three first packets are received, distance function coefficients are calculated in accordance with the following equation:

$$\begin{bmatrix} d_1 \\ d_2 \\ \ldots \\ d_n \end{bmatrix} = \begin{pmatrix} sd_1 & h_1 & 1 \\ sd_2 & h_2 & 1 \\ \ldots & \ldots & \ldots \\ sd_n & h_n & 1 \end{pmatrix} \begin{bmatrix} \alpha_0 \\ \alpha_1 \\ \alpha_2 \end{bmatrix},$$

wherein n is a natural number equal to or greater than 3, d is an actual distance between a node transmitting the one of the three first packets and a node receiving the one of the three first packets and calculated using location information, sd is a corresponding first information, h is corresponding second information, and $\alpha_0$, $\alpha_1$, $\alpha_2$ are distance function coefficients.

10. The method of claim 9, wherein the estimating of the unknown location further comprises:
receiving at least three second packets;
calculating distances to nodes transmitting the second packets by use of distance function coefficients contained in the received second packets and first and second information with respect to the nodes transmitting the second packets; and
estimating the unknown location using the unknown locations of and the distances to the nodes transmitting the second packet.

11. A computer readable storage medium comprising computer readable code to control an implementation of the method of claim 1.

12. A system estimating an unknown location of a second node using a known location of a first node, both in a communication system, comprising:
the first node generating a second packet containing a distance function coefficient calculated using a sum of transmission distances of the first packet and a hop counter contained in a first packet received via the second node whose location is unknown; and
the second node estimating its location using the distance function coefficient, as received by the second node in the second packet.

13. The system of claim 12, wherein the second node calculates and stores distances to one-hop nodes.

14. The system of claim 12, wherein the first node transfers the first packet, containing location information of the first node, to another node having a known location.

15. The system of claim 12, wherein a node relaying the first packet updates the first information and the second information of the first packet, and transfers the updated first packet with the updated first and second information.

16. The system of claim 15, wherein the first node calculates distance function coefficients if at least three first packets are received in accordance with the following equation:

$$\begin{bmatrix} d_1 \\ d_2 \\ \ldots \\ d_n \end{bmatrix} = \begin{pmatrix} sd_1 & h_1 & 1 \\ sd_2 & h_2 & 1 \\ \ldots & \ldots & \ldots \\ sd_n & h_n & 1 \end{pmatrix} \begin{bmatrix} \alpha_0 \\ \alpha_1 \\ \alpha_2 \end{bmatrix},$$

wherein n is a natural number equal to or greater than 3, d is an actual distance between a node transmitting one of the three first packets and a node receiving the one of the three first packets and calculated using location information, sd is a corresponding first information, h is a corresponding second information, and $\alpha_0$, $\alpha_1$, $\alpha_2$ are distance function coefficients.

17. The system of claim 16, wherein the second node, when at least three second packets are received by the second node, calculates distances to nodes transmitting the second packets by use of distance function coefficients contained in the received second packets and stored first and second information with respect to the nodes transmitting the second packets, and
the second node estimates the unknown location using locations of and the distances to the nodes transmitting the second packets.

18. A sensor network, comprising:
a base node; and
a plurality of nodes communicating sensory data to the base nodes based on locations of each of the plurality of nodes, using the system of estimating an unknown location of claim 12 for nodes whose location is unknown.

* * * * *

UNITED STATES PATENT AND TRADEMARK OFFICE
CERTIFICATE OF CORRECTION

PATENT NO. : 7,623,512 B2  Page 1 of 1
APPLICATION NO. : 11/144690
DATED : November 24, 2009
INVENTOR(S) : Dae-young Kim et al.

It is certified that error appears in the above-identified patent and that said Letters Patent is hereby corrected as shown below:

Column 8, Line 55, change "claim 1" to --claim 1,--.

Signed and Sealed this

Sixteenth Day of February, 2010

David J. Kappos
*Director of the United States Patent and Trademark Office*